US012568532B2

(12) United States Patent
He

(10) Patent No.: US 12,568,532 B2
(45) Date of Patent: Mar. 3, 2026

(54) METHOD FOR RANDOM ACCESS RESOURCE DETERMINATION, NETWORK DEVICE, AND STORAGE MEDIUM

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 400 days.

(21) Appl. No.: 18/147,514

(22) Filed: Dec. 28, 2022

(65) Prior Publication Data

US 2023/0276503 A1 Aug. 31, 2023

Related U.S. Application Data

(63) Continuation of application No. PCT/CN2020/128683, filed on Nov. 13, 2020.

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ......... H04W 74/0833; H04W 74/0836; H04W 74/004; H04W 74/002; H04W 74/006;
(Continued)

(56) References Cited

U.S. PATENT DOCUMENTS

2021/0029744 A1* 1/2021 Bae .................. H04W 74/0833
2021/0410182 A1* 12/2021 Zhang .................. H04L 5/0044
(Continued)

FOREIGN PATENT DOCUMENTS

CN 111148268 5/2020
KR 20210133423 A * 11/2021
(Continued)

OTHER PUBLICATIONS

Park et al (KR Publication No. 2021/0133423)) (Year: 2021).*
(Continued)

*Primary Examiner* — Sun Jong Kim
(74) *Attorney, Agent, or Firm* — Hodgson Russ LLP

(57) ABSTRACT

A method for random access resource determination, a network device, and a storage medium are provided. The method includes the following. A first preamble set is mapped to a first physical uplink shared channel (PUSCH) resource set in a first mapping manner, where the first preamble set belongs to a first random access channel occasion (RO) set, and the first preamble set or the first RO set is used for a random access procedure of a first-type terminal. A second preamble set is mapped to a second PUSCH resource set in a second mapping manner, where the second preamble set belongs to a second RO set, and the second preamble set or the second RO set is used for a random access procedure of a second-type terminal. The random access procedure is a type-2 random access procedure.

16 Claims, 8 Drawing Sheets

(58) Field of Classification Search

CPC .......... H04W 72/1268; H04W 74/0866; H04L 1/18; H04L 1/0009; H04L 1/08; H04L 5/0044; H04L 5/0051; H04L 5/0094; H04L 1/0018

See application file for complete search history.

(56) References Cited

U.S. PATENT DOCUMENTS

| | | | |
|---|---|---|---|
| 2022/0417999 A1* | 12/2022 | Li | H04W 74/0833 |
| 2023/0085104 A1* | 3/2023 | Park | H04L 1/08 |
| | | | 370/329 |

FOREIGN PATENT DOCUMENTS

| | | |
|---|---|---|
| WO | 2018175705 | 9/2018 |
| WO | 2020198980 | 10/2020 |

OTHER PUBLICATIONS

Zte et al., "Remaining issues on the channel access procedure for NR-U," 3GPP TSG RAN WG1 #100b, R1-2001705, Apr. 2020.

NTT Docomo, Inc., "Maintenance for Channel Structure for Two-Step RACH," 3GPP TSG RAN WG1 #100bis, R1-2002431, Apr. 2020.

EPO, Extended European Search Report for EP Application No. 20961170.6, Oct. 17, 2023.

"3rd Generation Partnership Project; Technical Specification Group Radio Access Network; NR; Physical layer procedures for control (Release 16)," 3GPP TS 38.213, Mar. 2020, v16.1.0.

Ericsson, "Identification and access control of RedCap UEs," 3GPP TSG-RAN WG2 #112e, Tdoc R2-200961, Nov. 2020.

WIPO, International Search Report and Written Opinion for International Application No. PCT/CN2020/128683, Jul. 29, 2021.

ZTE, "Random access procedure and messages for NB-Iot," 3GPP TSG-RAN WG2 Nb-Iot AH, R2-160530, Jan. 2016.

Epo, Communication for EP Application No. 20961170.6, Sep. 16, 2024.

* cited by examiner

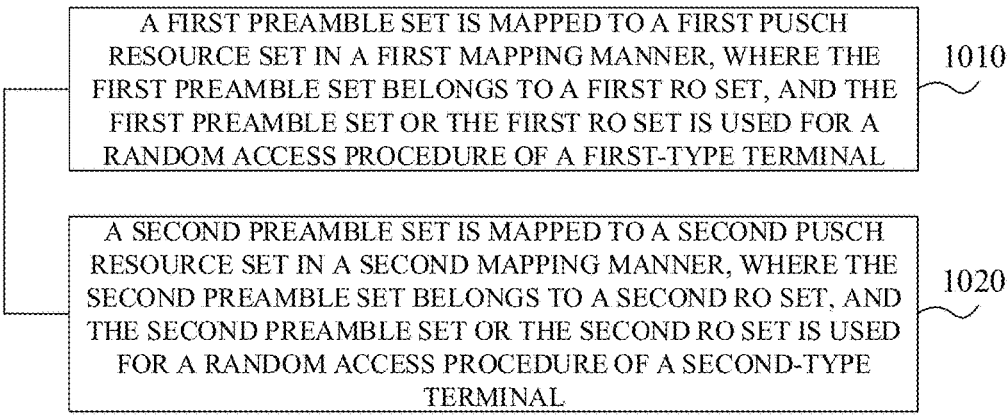

A FIRST PREAMBLE SET IS MAPPED TO A FIRST PUSCH RESOURCE SET IN A FIRST MAPPING MANNER, WHERE THE FIRST PREAMBLE SET BELONGS TO A FIRST RO SET, AND THE FIRST PREAMBLE SET OR THE FIRST RO SET IS USED FOR A RANDOM ACCESS PROCEDURE OF A FIRST-TYPE TERMINAL ⁓ 1010

A SECOND PREAMBLE SET IS MAPPED TO A SECOND PUSCH RESOURCE SET IN A SECOND MAPPING MANNER, WHERE THE SECOND PREAMBLE SET BELONGS TO A SECOND RO SET, AND THE SECOND PREAMBLE SET OR THE SECOND RO SET IS USED FOR A RANDOM ACCESS PROCEDURE OF A SECOND-TYPE TERMINAL ⁓ 1020

FIG. 10

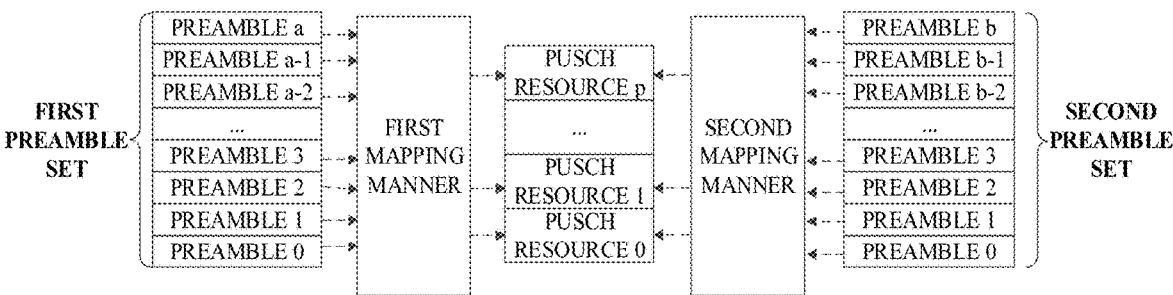

FIG. 11

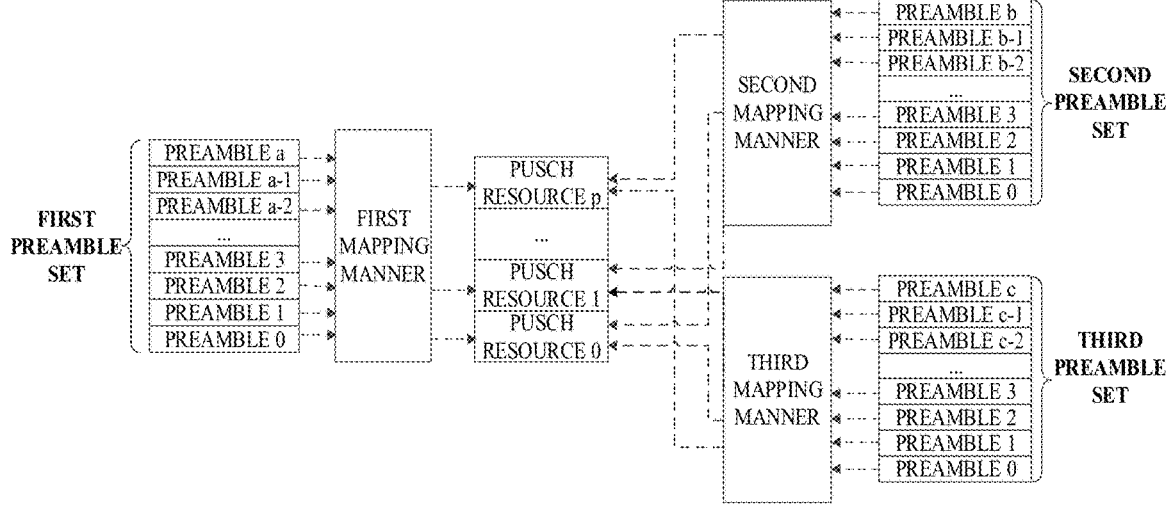

FIG. 12

METHOD FOR RANDOM ACCESS RESOURCE DETERMINATION, NETWORK DEVICE, AND STORAGE MEDIUM

CROSS REFERENCE TO RELATED APPLICATION(S)

This application is a continuation of International Application No. PCT/CN2020/128683, filed Nov. 13, 2020, the entire disclosure of which is incorporated herein by reference.

TECHNICAL FIELD

This disclosure relates to the field of wireless communication, and particularly to a method for random access resource determination, a network device, and a storage medium.

BACKGROUND

In a type-2 random access procedure, a terminal is configured to transmit a message A (i.e., Msg A), where the Msg A includes a preamble and a physical uplink shared channel (PUSCH).

A random access channel occasion (RO) where the preamble is located is associated with a PUSCH occasion (PO) where the PUSCH is located. One PO may include multiple PUSCH resources. Due to the association between the RO and the PO, a preamble set composed of preambles can be mapped to a PUSCH resource set composed of PUSCH resources according to a certain mapping in one association period.

The terminal mentioned above may be regarded as a conventional terminal. In new radio (NR), a reduced-capability (RedCap) terminal is introduced, which has characteristics of low complexity, low cost, and low capability. In the related art, no good solution has been provided to map a preamble set of a RedCap terminal to a PUSCH resource set when the RedCap terminal performs a type-2 random access procedure.

SUMMARY

In a first aspect, a method for random access resource determination is provided. The method includes the following. A first preamble set is mapped to a first PUSCH resource set in a first mapping manner, where the first preamble set belongs to a first random access channel occasion (RO) set, and the first preamble set or the first RO set is used for a random access procedure of a first-type terminal. A second preamble set is mapped to a second PUSCH resource set in a second mapping manner, where the second preamble set belongs to a second RO set, and the second preamble set or the second RO set is used for a random access procedure of a second-type terminal. The random access procedure is a type-2 random access procedure.

In a second aspect, a network device is provided. The network device includes a processor, a memory configured to store computer programs, and a transceiver coupled with the processor. The processor is configured to invoke and execute the computer programs stored in the memory to perform the method for random access resource determination of the first aspect.

In a third aspect, a computer-readable storage medium is provided. The computer-readable storage medium stores computer programs, and the computer programs are loaded and executed by a processor to perform the method for random access resource determination of the first aspect.

BRIEF DESCRIPTION OF THE DRAWINGS

In order to illustrate more clearly the technical solution in implementations of the disclosure, accompanying drawings required for illustrating implementations are introduced briefly as follows. Apparently, the accompanying drawings illustrated below are merely some implementations of the disclosure. For those skilled in the art, other drawings may also be obtained based on these accompanying drawings without creative efforts.

FIG. 10 is a flowchart of a method for random access resource determination provided in an exemplary implementation of the disclosure.

FIG. 11 is a schematic diagram illustrating a mapping between a preamble set and a PUSCH resource set provided in an exemplary implementation of the disclosure.

FIG. 12 is a schematic diagram illustrating a mapping between a preamble set and a PUSCH resource set provided in an exemplary implementation of the disclosure.

DETAILED DESCRIPTION

In order to make purposes, technical solutions, and advantages of the disclosure clearer, implementations of the disclosure are described in detail below in combination with the accompanying drawings.

First, terms involved in implementations of the disclosure are briefly introduced.

Synchronization Signal Block (SSB)

Common channels and signals in a new radio (NR) system, such as a synchronization signal (SS) and a physical broadcast channel (PBCH), need to cover an entire cell through multi-beam scanning, to facilitate terminal reception in the cell.

Random Access

In Rel-15 NR technology, a random access channel (RACH) resource configured for an access terminal is defined. There are 256 RACH resource configurations.

A RACH resource configuration used for a cell is indicated to an access terminal in a system message. Each RACH resource configuration contains: a preamble format, a period, a radio frame offset, a serial number of a subframe within a radio frame, a starting symbol within a subframe, the number of physical random access channel (PRACH) slots within a subframe, the number of random access channel occasion (RO) within a PRACH slot, an RO duration, etc. The terminal can obtain information on time, frequency, and code of the PRACH resource according to the RACH resource configuration indicated.

TABLE 1

| PRACH configuration index | preamble format | $n_{SFN}$ mod x = y | | subframe number | starting symbol | number of PRACH slots within a subframe | $N_t^{RA, slot}$, number of ROs within a PRACH slot | $N_{dur}^{RA}$, PRACH duration |
|---|---|---|---|---|---|---|---|---|
| | | x | y | | | | | |
| 86 | A1 | 1 | 0 | 0, 1, 2, 3, 4, 5, 6, 7, 8, 9 | 7 | 1 | 3 | 2 |

Multi-beam transmission of an SS is performed through SS/PBCH burst set definition. One SS/PBCH burst set includes one or more SSBs, and one SSB is used for carrying SSs and broadcast channels of one beam. Therefore, one SSB may contain SSs of beams, where the number of the beams is equal to the number of SS blocks in the cell ("SS block number" for short). The maximum SS block number, represented by L, is related to a frequency band of the system. For a frequency band up to 3 GHz, L is 4, for a frequency band from 3 GHz to 6 GHz, L is 8, and for a frequency band from 6 GHz to 52.6 GHz, L is 64.

Figure 1:
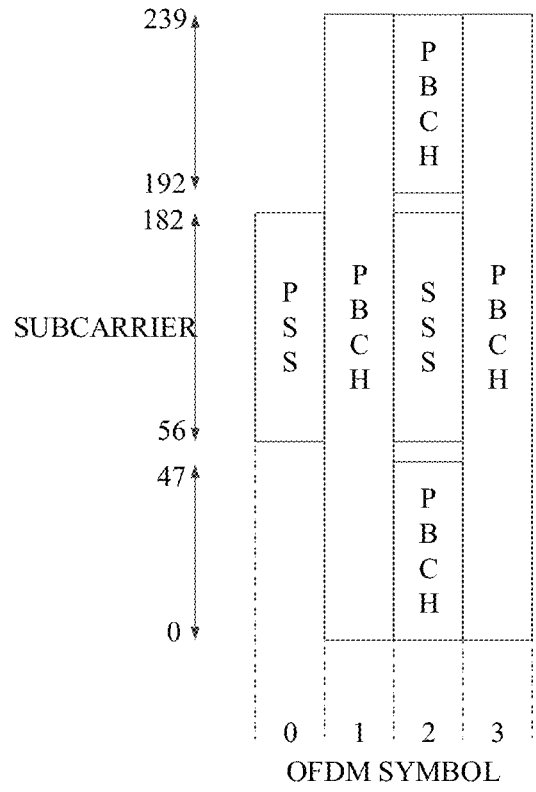
FIG. 1 is a schematic diagram of a synchronization signal block (SSB) provided in an exemplary implementation of the disclosure.

As illustrated in FIG. 1, one SSB contains a primary synchronization signal (PSS) of one symbol, a secondary synchronization signal (SSS) of one symbol, and PBCHs of two symbols. A time-frequency resource occupied by the PBCH contains a demodulation reference signal (DMRS) that is used for PBCH demodulation.

All SSBs in the SS/PBCH burst set are transmitted in a time window with a size of 5 ms ("5 ms time window" for short), and are repeatedly transmitted at a certain period. The period can be configured by means of a higher layer parameter, i.e., SSB-timing, and may be 5 ms, 10 ms, 20 ms, 40 ms, 80 ms, 160 ms, etc. A terminal obtains an SSB index according to the SSB received, a value range of the SSB index is [0, L−1], and L is the maximum number of SSBs corresponding to the frequency band where the SSB is located. The SSB index corresponds to a relative position of the SSB in the 5 ms time window. The terminal can obtain frame synchronization according to the relative position of the SSB and a half-frame indication carried in the PBCH. The SSB index is indicated by the DMRS of the PBCH or information carried in the PBCH.

In addition to the SS and the PBCH, some other common information, such as system information block 1 (SIB1) and paging, also needs to be transmitted by means of multi-beam scanning.

As illustrated in Table 1, the PRACH configuration index is 86, which indicates the preamble format, the radio frame where the RO is located, the subframe, the starting symbol, and the duration, etc.

A frequency-domain resource location of a RACH resource can be indicated by parameters msg1-FrequencyStart and msg1-FDM in a higher layer signaling RACH-ConfigGeneric. msg1-FrequencyStart is used to determine an offset of a starting position of a resource block (RB) corresponding to physical uplink shared channel (PUSCH) occasion (PO) 0 relative to a starting position of uplink common band width part (BWP) in the frequency domain (i.e., BWP 0), that is, to determine a starting position of the RACH resource in the frequency domain. The value of msg1-FDM includes {1, 2, 4, 8}, which is used to determine the number of ROs in the frequency domain.

Figure 2:
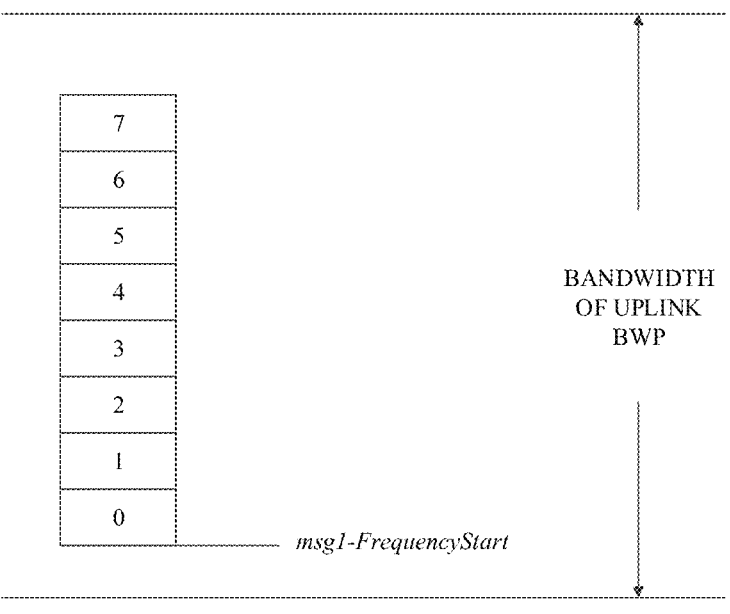
FIG. 2 is a schematic diagram illustrating a frequency-domain resource location of a random access channel (RACH) resource provided in an exemplary implementation of the disclosure.

As illustrated in FIG. 2, FIG. 2 is a schematic diagram illustrating a frequency-domain resource location of a RACH resource. msg1-FDM=8, that is, there are 8 ROs in frequency domain, including RO 0, RO 1, RO 2, RO 3, RO 4, RO 5, RO 6, and RO 7.

For a terminal, on the basis that a system message indicates a RACH resource configuration, the system message also indicates an association between an SSB and a RACH resource, so that the terminal can determine, according to the SSB detected and the association indicated, a RACH resource that can be used by the terminal. Each SSB is associated with one or more ROs and multiple contention based preambles. That is, each SSB index is associated with a part of specific resources in the RACH resource configuration indicated in the system message.

A higher layer is used to associate N SSBs with one RO through a parameter ssb-perRACH-Occasion, and configure the number of contention based preambles of each SSB in each valid RO through a parameter CB-PreamblesPerSSB.

If N<1, one SSB is mapped to 1/N consecutive valid ROs. For example, if N=¼, one SSB is mapped to four ROs, and R preambles with consecutive indexes are mapped to SSB n, $0<=n<=N-1$, and each valid RO starts form a preamble index 0.

If $N>=1$, R preambles with consecutive indexes are mapped to SSB n, $0<=n<=N-1$, and each valid RO starts form a preamble index $n*N_{preamble}^{total}/N$. For example, if N=2 and $N_{preamble}^{total}=64$, two SSBs are mapped to one RO. For the two SSBs n, n=0, 1. If n=0, a preamble index on SSB 0 starts from 0. If n=1, a preamble index on SSB 1 starts from 32. Preamble indexes on SSB 0 are 0 to 31, and preamble indexes on SSB 1 are 32 to 63. One valid RO corresponds to all contention based preambles, and in this case, one valid RO covers two SSBs. Therefore, the two SSBs each occupy a part of the preambles. $N_{preamble}^{total}$ is configured by totalNumberOfRA-Preambles, and is an integer multiple of N.

An example of a related signaling is given below: ssb-perRACH-OccasionAndCB-PreamblesPerSSB CHOICE {oneFourth ENUMERATED{n4, n8, n12, n16, n20, n24, n28, n32, n36, n40, n44, n48, n52, n56, n60, n64}. In the signaling, oneFourth represents that one SSB is associated with four ROs, n4 represents that one SSB is associated with four contention based preambles on one RO, etc. The total number of contention based preambles on one RO is equal to CB-PreamblesPerSSB*max(1, ssb-perRACH-Occasion). CB-PreamblesPerSSB is 4, and ssb-perRACH-Occasion is ¼.

A mapping from an SSB to an RO follows the following order.

First, in increasing order of preamble indexes within one RO.

Second, in increasing order of frequency resource indexes for frequency multiplexed ROs.

Third, in increasing order of time-domain resource indexes for time multiplexed ROs within a PRACH slot.

Fourth, in increasing order of indexes for PRACH slots.

Figure 3:
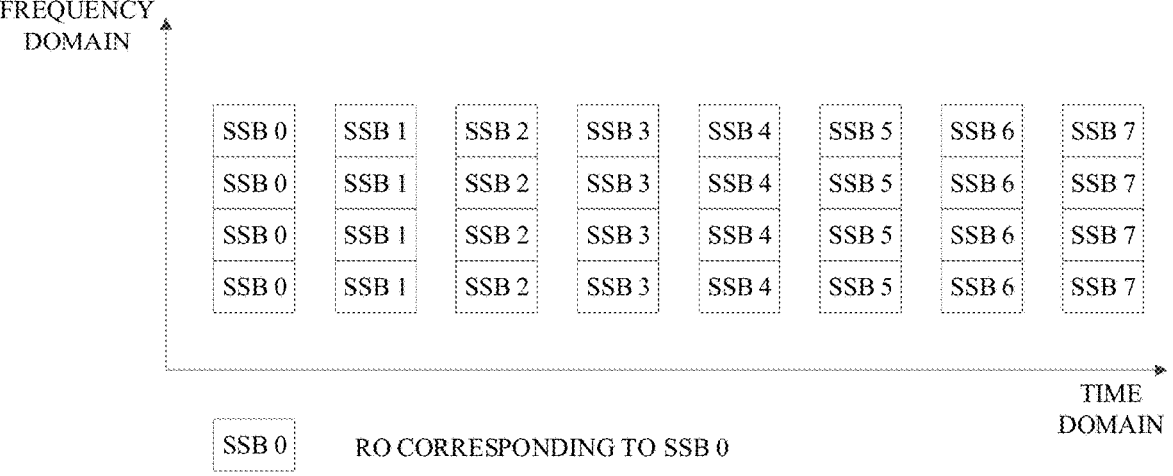
FIG. 3 is a schematic diagram illustrating a mapping between SSBs and random access channel occasions (RO) provided in an exemplary implementation of the disclosure.

Exemplarily, the number of SSBs is 8 (with serial numbers 0 to 7), msg1-FDM=4 (which represents the number of frequency multiplexed ROs), ssb-perRACH-Occasion=¼, and a schematic diagram illustrating a mapping between the SSBs and the ROs is illustrated in FIG. 3.

Type-2 RACH Procedure

In the NR standardization process, in consideration of characteristics of low latency and high reliability of related services, a latency overhead in a 4-step RACH procedure is relatively large, which is inappropriate for a scenario requiring low latency and high reliability in 5G. In R16, a type-2 random access procedure, i.e., a 2-step RACH procedure, is introduced. The type-2 random access procedure may have a reduced access latency compared to the 4-step RACH procedure.

Figure 4:
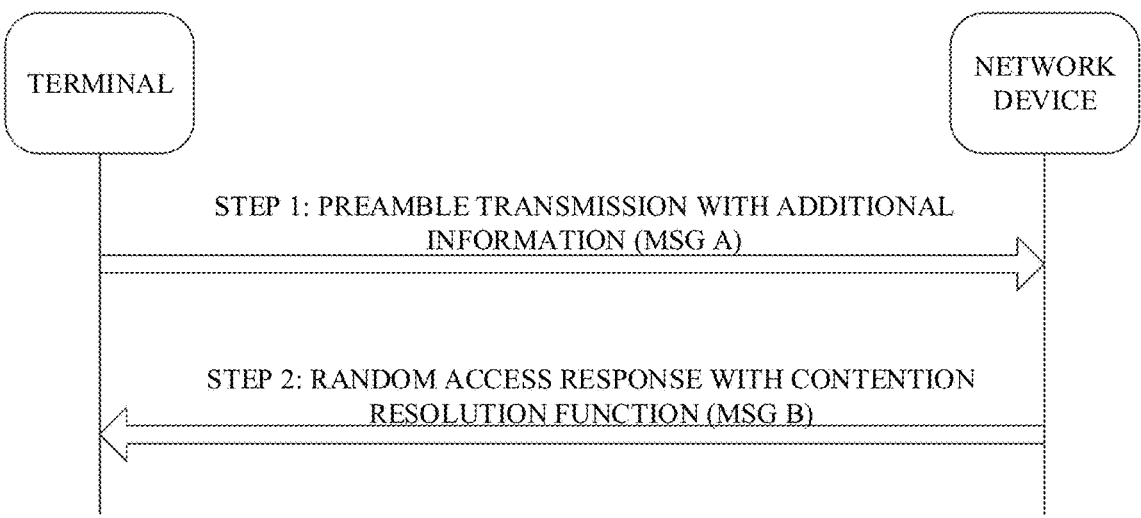
FIG. 4 is a schematic diagram of a type-2 random access procedure provided in an exemplary implementation of the disclosure.

The type-2 random access procedure is illustrated in FIG. 4. In the type-2 random access procedure, the first step and the third step of the 4-step RACH procedure are merged into the first step of the type-2 random access procedure, that is, the terminal transmits a message A (Msg A). The second step and the fourth step of the 4-step RACH procedure are merged into the second step of the type-2 random access procedure, that is, the network device responds a message B (Msg B). For the type-2 random access procedure, the Msg A contains a preamble and a PUSCH, and the Msg B contains a physical downlink control channel (PDCCH) and a physical downlink shared channel (PDSCH).

Figure 5:
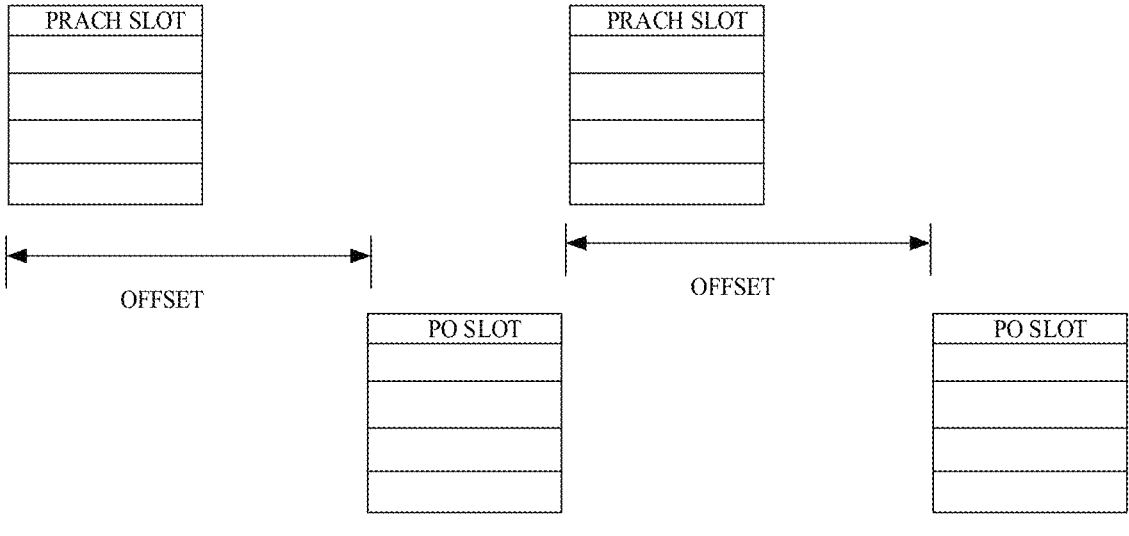
FIG. 5 is a schematic diagram illustrating time-domain locations of physical uplink shared channel (PUSCH) occasions (PO) and ROs provided in an exemplary implementation of the disclosure.

For the Msg A, the terminal needs to transmit a preamble and a PUSCH. An RO where the preamble is located is also configured by the network as in the 4-step RACH procedure. The RO may be shared with an RO in the 4-step RACH procedure, or may be configured separately. A time-frequency resource where the PUSCH is located is referred to as PO. One PO may include multiple PUSCH resources. One PUSCH resource is associated with a specific DMRS. The DMRS contains a DMRS port and a DMRS sequence. The DMRS sequence may be used for orthogonal frequency division multiple access (OFDMA). The PO is also configured by the network, a period of the PO is the same as that of the RO, and the PO is associated with the RO. As illustrated in FIG. 5, the relative relationship in time-frequency location between POs and associated ROs is configured by the network.

Examples of configuration parameters of a PO include: a modulation coding scheme (MCS)/transport block size (TBS), a start of the PO in the frequency domain in an active BWP, the number of RBs in the PUSCH, a guard period between POs, a starting symbol of the first PO in a slot and the number of symbols in each PO, a guard band between POs, the number of frequency multiplexed POs, the number of PUSCH slots, and the number of POs in each PUSCH slot.

Figure 6:
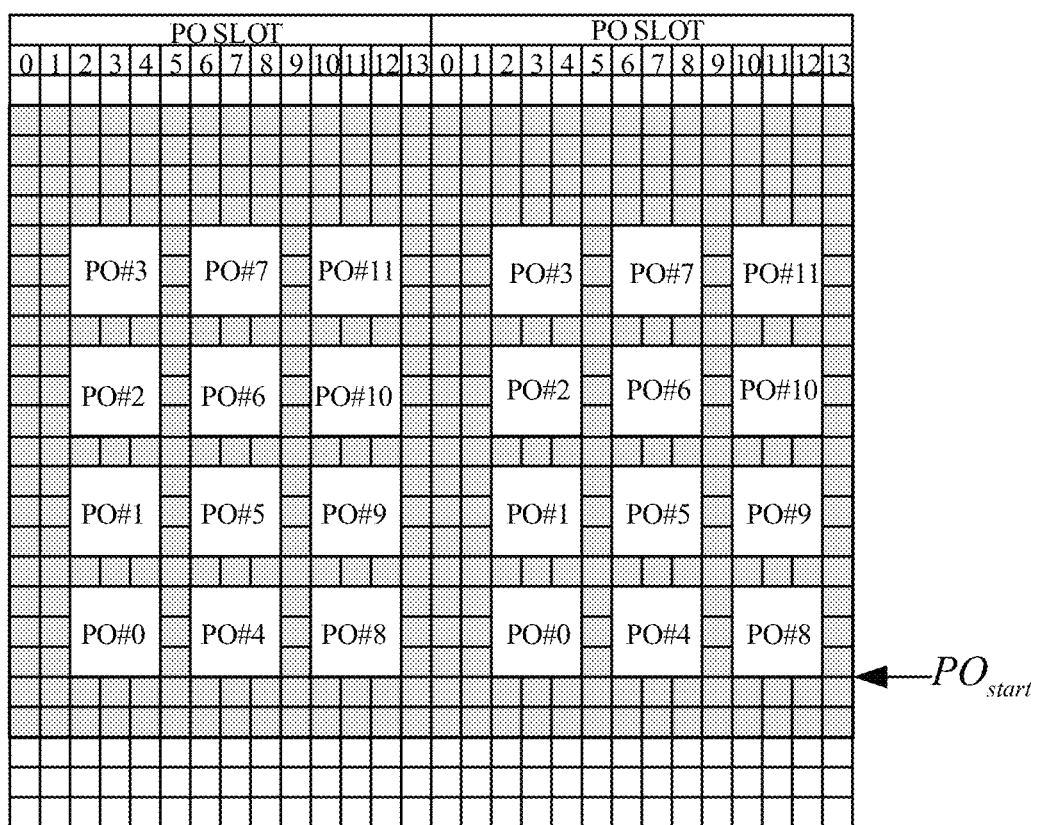
FIG. 6 is a schematic diagram illustrating POs after configuration provided in an exemplary implementation of the disclosure.

Exemplarily, referring to FIG. 6, the start of the PO in the frequency domain in the active BWP is denoted as $PO_{start}$, and the number of RBs in the PUSCH is 4. The guard period between POs is one symbol. The starting symbol of the first PO in the slot is symbol 2, and the number of symbols in each PO is 3. The guard band between POs is one RB. The number of frequency multiplexed POs is 4. The number of PUSCH slots is 2. The number of POs in each PUSCH slot is 3.

Mapping between a preamble set and a PUSCH resource set

The number T1 of preambles in one preamble set is a product of the number of valid ROs and the number of preambles in each RO in one association period. The preamble set is associated with one PUSCH resource set in one association period according to a certain mapping. The number T2 of PUSCH resources in the PUSCH resource set is a product of the number of valid POs and the number of DMRS resource indexes in each PO in one association period.

Every N (N>=1) consecutive preambles are mapped to valid PUSCH resources in the following orders.

First, in increasing order of frequency resource indexes for frequency multiplexed POs.

Second, in increasing order of DMRS resource indexes within a PO, where the DMRS resource indexes are sorted first in ascending order of DMRS port indexes and then in ascending order of DMRS sequence indexes.

Third, in increasing order of time-domain resource indexes for time multiplexed POs within a PUSCH slot.

Fourth, in increasing order of indexes for PUSCH slots.

Here, N=ceil (T1/T2).

Figure 7:
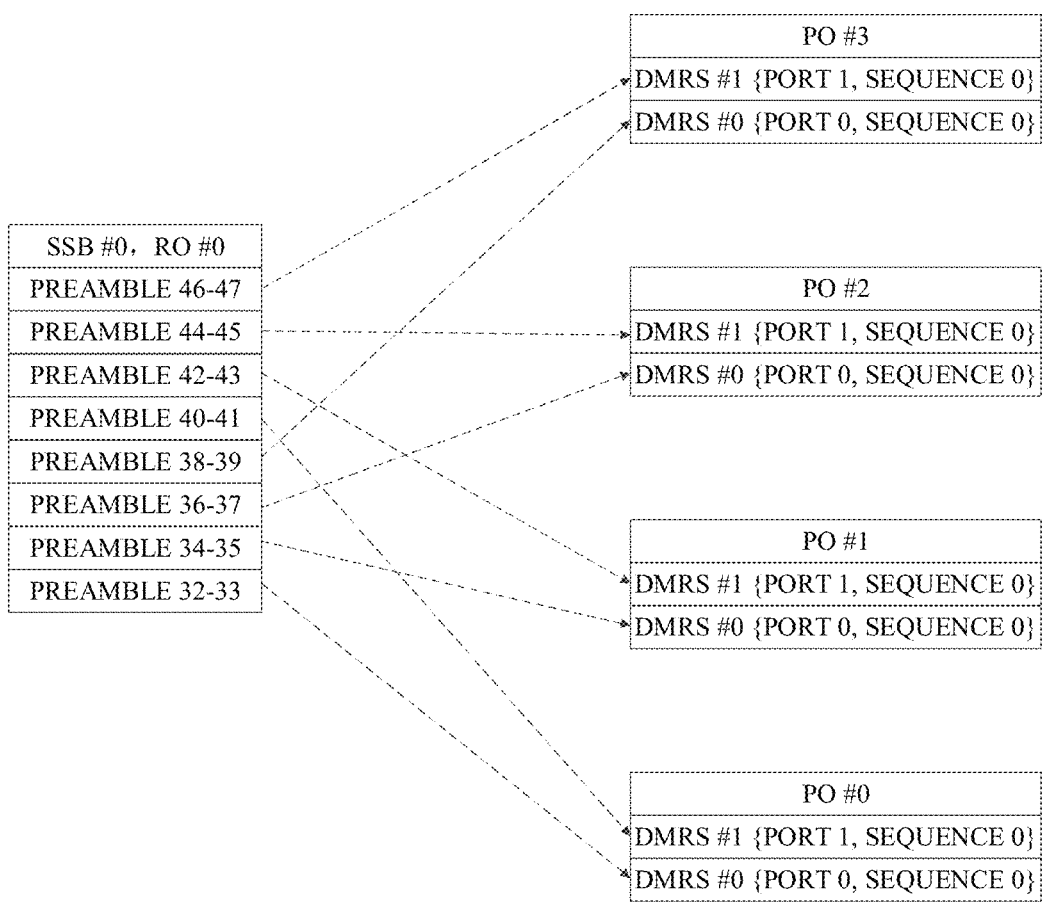
FIG. 7 is a schematic diagram illustrating a mapping between a preamble set and a PUSCH resource set provided in an exemplary implementation of the disclosure.

Exemplarily, as illustrated in FIG. 7, T1 is 16, T2 is 8, every two consecutive preambles are mapped to one valid PUSCH resource, and the mapping order is as above.

Reduced-Capability (RedCap) Terminal

An NR system is mainly designed to support an enhanced mobile broadband (eMBB) service, and can meet requirements of high speed, high spectrum efficiency, and large bandwidth. In fact, in addition to the eMBB, there are various service types, such as sensor networks, video surveillance, wearable devices, etc., which have different requirements from the eMBB service in speed, bandwidth, power consumption, cost, etc. Compared with a terminal supporting the eMBB, a terminal supporting these services has a reduced capability, for example, a reduced supported bandwidth, a relaxed processing time, and a reduced number of antennas. The NR system needs to be optimized for these services, and the optimized system is referred to as a NR-light system.

In long term evolution (LTE) technology, there are similar system designs for supporting terminals with a large number of connections, low power consumption, and low cost, such as machine type communication (MTC) and narrow band internet of things (NB-IoT). In the NR system, it is desirable to introduce a similar technology for supporting other service types except the eMBB service. A terminal supporting such services has characteristics of low complexity, low cost, and low capability, and is referred to as a RedCap terminal.

Since the RedCap terminal is introduced into the NR system, a network device may configure a corresponding preamble set for the RedCap terminal.

Figures 8, 9:
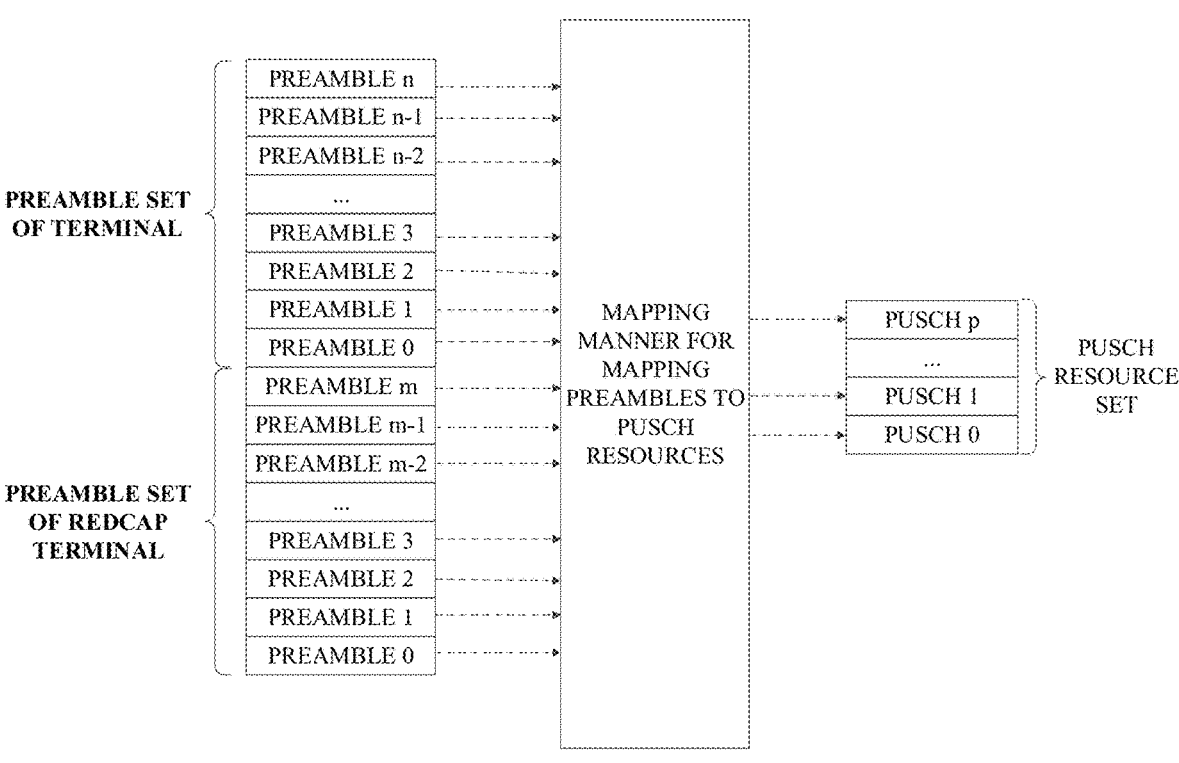
FIG. 8 is a schematic diagram of a method for random access resource determination for a reduced-capability (RedCap) terminal provided in the related art.
FIG. 9 is a block diagram of a communication system provided in an exemplary implementation of the disclosure.

According to a similar solution in the related art, all preambles corresponding to a type-2 random access procedure are mapped to PUSCH resources in a PUSCH resource set in a mapping manner. As illustrated in FIG. 8, when performing mapping, the network device merges one preamble set corresponding to a terminal and one preamble set corresponding to a RedCap terminal into one larger preamble set, and then maps the preamble set to a PUSCH resource set. The terminal refers to a terminal other than a RedCap terminal, and may be regarded as a conventional terminal, a normal terminal, or the like.

The problem of this solution is that the terminal can only map a preamble set configured for the terminal to a PUSCH resource set because the terminal cannot obtain information of a preamble set configured for the RedCap terminal. The preamble and the PUSCH in the Msg A transmitted by the terminal do not conform to a mapping determined by the network device according to the solution. The network device determines the PUSCH transmitted by the terminal according to a preamble received and the mapping determined by the network device. However, a PUSCH actually transmitted by the terminal is inconsistent with the PUSCH determined by the network. Therefore, the PUSCH for the terminal in the type-2 random access procedure cannot be correctly received by the network device.

Exemplarily, the terminal determines, according to a mapping configured for the terminal, that preamble n is to be mapped to PUSCH 1. After a RedCap terminal is introduced, the network device merges one preamble set corresponding to a terminal and one preamble set corresponding to a RedCap terminal into a merged preamble set, and determines a mapping for the merged preamble set. In this case, preamble n for the terminal is considered by the network device to be mapped to PUSCH p, and thus a mapping result considered by the terminal is inconsistent with a mapping result considered by the network device, thereby affecting the subsequent reception for PUSCH. n and p are positive integers.

The solution provided in the disclosure is described exemplarily as follows.

FIG. 9 illustrates a block diagram of a communication system provided in an exemplary implementation of the disclosure. The communication system may include an access network 12 and a terminal device 14.

The access network 12 includes several network devices 120. The network device 120 may be a base station. The base station is a device deployed in an access network to provide wireless communication functions for terminals. The base station may include macro base stations, micro base stations, relay stations, access points, and the like in various forms.

In systems adopting different radio access technologies, devices having a base station function may have different names. For example, in an LTE system, such devices are referred to as eNodeB or eNB, and in a 5G NR system, such devices are referred to as gNodeB or a gNB. The name "base station" may change with the evolution of communication technology. For the convenience of illustration, devices that provide a wireless communication function for the terminal device 14 are collectively referred to as network device in implementations of the disclosure.

The terminal device 14 may include various handheld devices, vehicle-mounted devices, wearable devices, computing devices with a wireless communication function, or processing devices coupled with a wireless modem, and user equipment (UE), mobile stations (MS), terminal devices, and the like in various forms. For the convenience of illustration, such devices are collectively referred to as terminals. The network device 120 and the terminal device 14 communicate with each other through a certain air interface technology, for example, a Uu interface. In implementations of the disclosure, the terminal device 14 may be a RedCap terminal. The RedCap terminal is a terminal having a capability lower than a conventional terminal and has characteristics of low complexity, low cost, and low capability.

The technical solution of implementations of the disclosure may be applied to various communication systems, for example, a global system of mobile communication (GSM), a code division multiple access (CDMA) system, a wideband code division multiple access (WCDMA) system, and a general packet radio service (GPRS), an LTE system, an LTE frequency division duplex (FDD) system, an LTE time division duplex (TDD) system, an advanced long term evolution (LTE-A) system, an NR system, an evolved NR system, and an LTE-based access to unlicensed spectrum (LTE-U) system, a universal mobile telecommunication system (UMTS), a worldwide interoperability for microwave access (WiMAX) communication system, a wireless local area network (WLAN), wireless fidelity (WiFi), a next generation communication system, or other communication systems, etc.

Generally speaking, a conventional communication system supports a limited number of connections, and therefore is easy to implement. However, with the development of communication technology, a mobile communication system will not only support conventional communication, but also support, for example, device to device (D2D) communication, machine to machine (M2M) communication, MTC, vehicle to vehicle (V2V) communication, and vehicle to everything (V2X) system. Implementations of the disclosure may also be applied to these communication systems.

FIG. 10 illustrates a flowchart of a method for random access resource determination provided in an exemplary implementation of the disclosure. The method is applicable to the network device illustrated in FIG. 9 and includes the following.

Step 1010, a first preamble set is mapped to a first PUSCH resource set in a first mapping manner, where the first preamble set belongs to a first RO set, and the first preamble set or the first RO set is used for a random access procedure of a first-type terminal.

Step 1020, a second preamble set is mapped to a second PUSCH resource set in a second mapping manner, where the second preamble set belongs to a second RO set, and the second preamble set or the second RO set is used for a random access procedure of a second-type terminal.

The random access procedure is a type-2 random access procedure.

The type-2 random access procedure is a type of random access introduced in R16, and may also be regarded as a 2-step random access procedure. As illustrated in FIG. 4, compared with a 4-step RACH procedure, the first step and the third step of the 4-step RACH procedure are merged into the first step of the type-2 random access procedure, that is, the terminal transmits an Msg A. The second step and the fourth step of the 4-step RACH procedure are merged into the second step of the type-2 random access procedure, that is, the network device responds an Msg B.

In implementations of the disclosure, the first-type terminal and the second-type terminal are two different types of terminals. Exemplarily, the second-type terminal is a terminal supporting MTC, and the first-type terminal is a terminal other than the second-type terminal. Exemplarily, the second-type terminal is a terminal supporting NB-IoT, and the first-type terminal is a terminal other than the second-type terminal. Exemplarily, the second-type terminal is a RedCap terminal, and the first-type terminal is a terminal other than the RedCap terminal.

The RedCap terminal refers to a terminal having a capability lower than the first-type terminal. In this case, the first-type terminal may be regarded as a conventional terminal, a normal terminal, and the like, and the first-type terminal includes a terminal other than the RedCap terminal. The RedCap terminal has a capability lower than the first-type terminal in that the RedCap terminal supports a reduced bandwidth, has a relaxed processing time, a reduced number of antennas, and the like. Optionally, the RedCap terminal has the characteristics of low complexity, low cost, and low capability. Optionally, the RedCap terminal is configured to support other service types except the eMBB service, such as sensor networks, video surveillance, and wearable devices. Compared with the eMBB service, these types of services require a lower speed, a narrower bandwidth, a lower power consumption, and a lower cost.

The first preamble set includes preambles for the type-2 random access procedure of the first-type terminal, and preambles in the first preamble set belongs to the first RO set. The second preamble set includes preambles for the type-2 random access procedure of the second-type terminal, and preambles in the second preamble set belongs to the second RO set. The network device needs to respectively map the first preamble set corresponding to the first-type terminal and the second preamble set corresponding to the second-type terminal, to ensure that each of the two preamble sets is mapped to a corresponding PUSCH resource set.

In the type-2 random access procedure, the Msg A transmitted by the first-type terminal or the second-type terminal includes a preamble and a PUSCH, where the PUSCH resource corresponds to a time-frequency resource where the PUSCH is located. The first PUSCH resource set includes PUSCH resources for the type-2 random access procedure of the first-type terminal. The second PUSCH resource set includes PUSCH resources for the type-2 random access procedure of the second-type terminal.

Optionally, due to the association between the PUSCH resource and the DMRS, one PUSCH resource and one DMRS associated with the PUSCH resource constitute a PUSCH resource unit (PRU). The first PUSCH resource set may also be regarded as a first PRU set, and the second PUSCH resource set may also be regarded as a second PRU set. The first PRU set includes PRUs for the type-2 random access procedure of the first-type terminal, and the second PRU set includes PRUs for the type-2 random access procedure of the second-type terminal. The DMRS contains a DMRS port and a DMRS sequence.

The type-2 random access procedure does not involve pre-scheduling information for the PUSCH. Therefore, the network device needs to define a mapping between a preamble set and a PUSCH resource set, so that after detecting a preamble, the network device can obtain information of a PUSCH resource, such as location and configuration information of the PUSCH resource, thereby reducing the decoding complexity of the PUSCH.

In implementations of the disclosure, the first PUSCH resource set may be the same as the second PUSCH resource set, that is, the network device may map the first preamble set and the second preamble set to the same PUSCH resource set. Alternatively, the first PUSCH resource set may be different from the second PUSCH resource set, that is, the network device may map the first preamble set and the second preamble set to different PUSCH resource sets.

Compared with the solution illustrated in FIG. 8, in implementations of the disclosure, the first preamble set and the second preamble set are not merged, and instead, the first preamble set is mapped to the first PUSCH resource set, and the second preamble set is mapped to the second PUSCH resource set. That is, the mapping of the first preamble set for the first-type terminal is independent from the mapping of the second preamble set for the second-type terminal. In a case where the second-type terminal is a type of terminal defined later by the network device, the preambles in the first preamble set transmitted by the first-type terminal and PUSCH resources in the first PUSCH resource set determined by the first-type terminal conform to a mapping determined by the network device, so that it can be avoided that the Msg A transmitted by the first-type terminal in the type-2 random access procedure cannot be correctly received by the network device.

In conclusion, according to the method provided in implementations, in a case where the second-type terminal (e.g., the RedCap terminal) is introduced to the communication system, the network device maps the first preamble set corresponding to the first-type terminal in the type-2 random access procedure to the first PUSCH resource set, and maps the second preamble set corresponding to the second-type terminal in the type-2 random access procedure to the second PUSCH resource set, thereby providing a technical solution for mapping a preamble set corresponding to a newly introduced type of terminal to a PUSCH resource set.

In addition, according to the method provided in implementations, the mapping of the first preamble set for the first-type terminal is independent from the mapping of the second preamble set for the second-type terminal, and thus a correct mapping of the first-type terminal already present in the communication system is not affected, thereby ensuring correctness of message transmission for the first-type terminal in the type-2 random access procedure, and thus improving success rate of random access.

In the following, for illustrative purposes, the second-type terminal is for example the RedCap terminal. The RedCap terminal has a capability lower than the first-type terminal.

In an optional implementation based on FIG. 10, there may be two cases for the mapping of the second preamble set by the network device.

(1) The second PUSCH resource set is the same as the first PUSCH resource set.

The network device maps the second preamble set corresponding to the RedCap terminal and the first preamble set corresponding to the first-type terminal to the same PUSCH resource set.

(2) The second PUSCH resource set is different from the first PUSCH resource set.

The network device maps the second preamble set corresponding to the RedCap terminal and the first preamble set corresponding to the first-type terminal to different PUSCH resource sets.

The above two cases are described exemplarily as follows.

(1) The second PUSCH resource set is the same as the first PUSCH resource set.

In a possible implementation, the network device sets a second preamble set for the RedCap terminal, and the second preamble set is mapped to the same PUSCH resource set as the first preamble set corresponding to the first-type terminal.

Optionally, a first mapping manner is used for the first preamble set, and a second mapping manner is used for the second preamble set, where the first mapping manner is the same as or different from the second mapping manner. The mapping manner for mapping any preamble set to a PUSCH resource set is not limited in implementations of the disclosure.

Exemplarily, referring to FIG. 11, the first-type terminal corresponds to a first preamble set that includes a+1 preambles, and the RedCap terminal corresponds to a second preamble set that includes b+1 preambles, where a and b are natural numbers. The first preamble set is mapped to a PUSCH resource set in a first mapping manner, and the second preamble set is mapped to the same PUSCH resource set in a second mapping manner. The PUSCH resource set includes p+1 PUSCH resources, where p is a natural number. The first mapping manner may be the same as or different from and the second mapping manner.

In another possible implementation, the network device supports classification of RedCap terminals, and RedCap terminals of different sub-types correspond to different preamble sets.

Optionally, the network device supports classification of RedCap terminals. The network device may classify the RedCap terminals according to service types (or service scenarios) supported by the RedCap terminals. For example, the RedCap terminals may be classified into RedCap terminals supporting sensor networks, RedCap terminals supporting video surveillance, and wearable RedCap terminals. The network device may classify the RedCap terminals according to capability characteristics of the RedCap terminals. For example, the RedCap terminals may be classified into RedCap terminals supporting a bandwidth in a first range and RedCap terminals supporting a bandwidth in a second range, where there is no intersection between the first range and the second range. The network device can also classify the RedCap terminals according to other aspects, which is not limited in implementations of the disclosure.

Optionally, the second preamble set or the second RO set is used for the random access procedure of the second-type terminal of a first sub-type. The network device maps a third preamble set to a third PUSCH resource set in a third mapping manner, where the third preamble set belongs to a third RO set, and the third preamble set or the third RO set is used for the random access procedure of the second-type terminal of a second sub-type. The first PUSCH resource set, the second PUSCH resource set, and the third PUSCH resource set are the same, and the random access procedure is the type-2 random access procedure. That is, the second preamble set corresponds to the second-type terminal of a sub-type, the third preamble set corresponds to the second-type terminal of another sub-type, and the network device maps preamble sets corresponding to the second-type terminals of different sub-types and the first preamble set corresponding to the first-type terminal to the same PUSCH resource set.

It can be understood that, for illustrative purposes, there are, for example, only two sub-types of second-type terminals, i.e., the second-type terminal of the first sub-type and the second-type terminal of the second sub-type. In practice, there may be n sub-types of second-type terminals, where n is a positive integer greater than 2. The network device maps preamble sets corresponding to the n sub-types of second-type terminals and the first preamble set corresponding to the first-type terminal to the same PUSCH resource set.

Optionally, the first mapping manner to the third mapping manner are the same, or the first mapping manner to the third mapping manner are different from one another, or at least two of the first mapping manner to the third mapping manner are the same. That is, the mapping manners used by second-type terminals of different sub-types and the mapping manner used by the first-type terminal may be the same, different, or partially the same. The mapping manner for mapping any preamble set to a PUSCH resource set is not limited in implementations of the disclosure.

Exemplarily, referring to FIG. 12, the first-type terminal corresponds to a first preamble set, where the first preamble set includes a+1 preambles, the RedCap terminal of a first sub-type corresponds to a second preamble set, and the RedCap terminal of a second sub-type corresponds to a third preamble set, where the second preamble set includes b+1 preambles, the third preamble set includes c+1 preambles, and a, b, and c are natural numbers. The first preamble set, the second preamble set, and the third preamble set are respectively mapped to the same PUSCH resource set in a first mapping manner, a second mapping manner, and a third mapping manner, where the PUSCH resource set includes p+1 PUSCH resources, and p is a natural number. The first mapping manner, the second mapping manner, and the third mapping manner may be the same, different, or partially the same.

In conclusion, according to the method provided in implementations, the second preamble set corresponding to the second-type terminal introduced may be mapped to the same PUSCH resource set as the first preamble set corresponding to the first-type terminal, so that the network device only needs to configure one PUSCH resource set without introducing a new PUSCH resource set, thereby saving overhead of PUSCH resources and improving a utilization rate of PUSCH resources.

According to the method provided in implementations, when there are second-type terminals of multiple sub-types, preamble sets may be configured for the second-type terminals of different sub-types respectively, and then are mapped to the same PUSCH resource set, so that the network device can distinguish sub-types of the second-type terminals according to different preambles.

(2) The second PUSCH resource set is different from the first PUSCH resource set.

In a possible implementation, the network device sets a second preamble set for the RedCap terminal, and the second preamble set and the first preamble set corresponding to the first-type terminal are mapped to different PUSCH resource sets.

Optionally, a first mapping manner is used for the first preamble set, and a second mapping manner is used for the second preamble set, where the first mapping manner is the same as or different from the second mapping manner. The mapping manner for mapping any preamble set to a PUSCH resource set is not limited in implementations of the disclosure.

Figure 13:
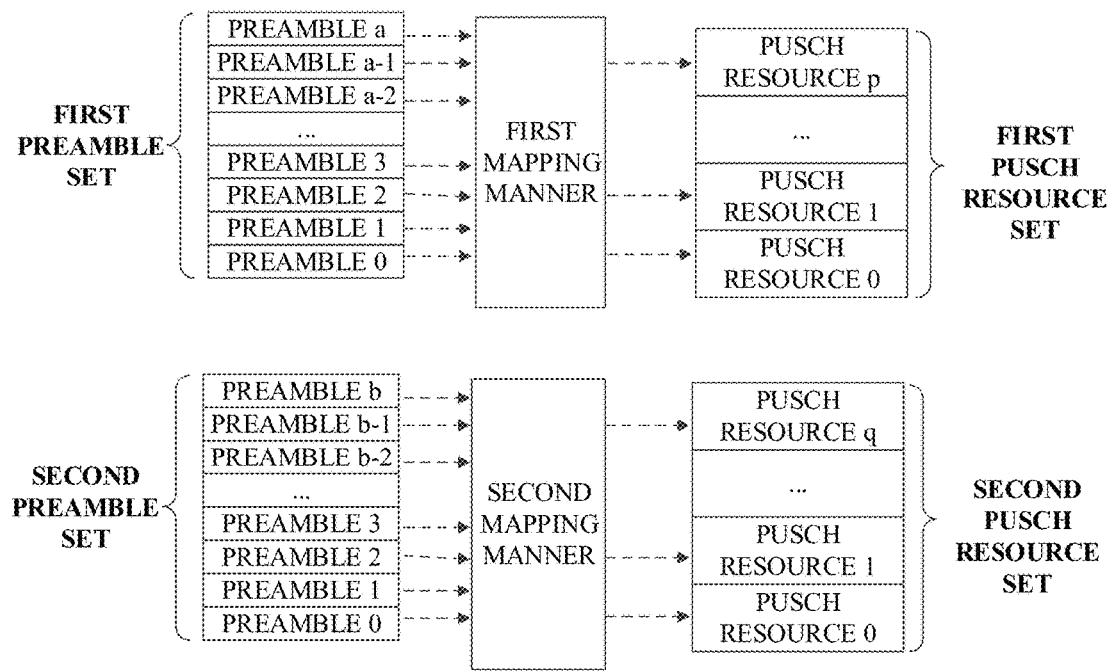
FIG. 13 is a schematic diagram illustrating a mapping between a preamble set and a PUSCH resource set provided in an exemplary implementation of the disclosure.

Exemplarily, referring to FIG. 13, the first-type terminal corresponds to a first preamble set that includes a+1 preambles, and the RedCap terminal corresponds to a second preamble set that includes b+1 preambles, where a and b are natural numbers. The first preamble set is mapped to a first PUSCH resource set in a first mapping manner, and the second preamble set is mapped to a second PUSCH resource set in a second mapping manner. The first PUSCH resource set and the second PUSCH resource set are different PUSCH resource sets, the first PUSCH resource set includes p+1 PUSCH resources, the second PUSCH resource set includes q+1 PUSCH resources, and p and q are natural numbers. The first mapping manner may be the same as or different from the second mapping manner.

In another possible implementation, the network device supports classification of RedCap terminals, and RedCap terminals of different sub-types correspond to different preamble sets.

Optionally, the network device supports classification of RedCap terminals. The network device may classify the RedCap terminals according to service types (or service scenarios) supported by the RedCap terminals. For example, the RedCap terminals may be classified into RedCap terminals supporting sensor networks, RedCap terminals supporting video surveillance, and wearable RedCap terminals. The network device may classify the RedCap terminals according to capability characteristics of the RedCap terminals. For example, the RedCap terminals may be classified into RedCap terminals supporting a bandwidth in a first range and RedCap terminals supporting a bandwidth in a second range, where there is no intersection between the first range and the second range. The network device can also classify the RedCap terminals according to other aspects, which is not limited in implementations of the disclosure.

Optionally, the second preamble set or the second RO set is used for the random access procedure of the second-type terminal of a first sub-type. The network device maps a third preamble set to a third PUSCH resource set in a third mapping manner, where the third preamble set belongs to a third RO set, and the third preamble set or the third RO set is used for the random access procedure of the second-type terminal of a second sub-type. The random access procedure is the type-2 random access procedure. Optionally, the third PUSCH resource set is the same as the second PUSCH resource set, or the third PUSCH resource set is different from the second PUSCH resource set. That is, the second preamble set corresponds to the second-type terminal of a sub-type, the third preamble set corresponds to the second-type terminal of another sub-type, and the network device maps preamble sets corresponding to the second-type terminals of different sub-types and the first preamble set corresponding to the first-type terminal to different PUSCH resource sets. Alternatively, the network device maps the preamble sets corresponding to the second-type terminals of different sub-types to the same PUSCH resource set, where the PUSCH resource set is different from the first PUSCH resource set to which the first preamble set corresponding to the first-type terminal is mapped.

It can be understood that, for illustrative purposes, there are, for example, only two sub-types of second-type terminals, i.e., the second-type terminal of the first sub-type and the second-type terminal of the second sub-type. In practice, there may be n sub-types of second-type terminals, where n is a positive integer greater than 2. The network device maps n preamble sets corresponding to the n sub-types of second-type terminals and the first preamble set corresponding to the first-type terminal respectively to n+1 different PUSCH resource sets. Alternatively, the network device maps the n preamble sets corresponding to the n sub-types of second-type terminals to the same PUSCH resource set, where the PUSCH resource set is different from the first PUSCH resource set to which the first preamble set corresponding to the first-type terminal is mapped.

Optionally, the first mapping manner to the third mapping manner are the same, or the first mapping manner to the third mapping manner are different from one another, or at least two of the first mapping manner to the third mapping manner are the same. That is, the mapping manners used by second-type terminals of different sub-types and the mapping manners used by the first-type terminal may be the same, different, or partially the same. The mapping manner for mapping any preamble set to a PUSCH resource set is not limited in implementations of the disclosure.

Figure 14:
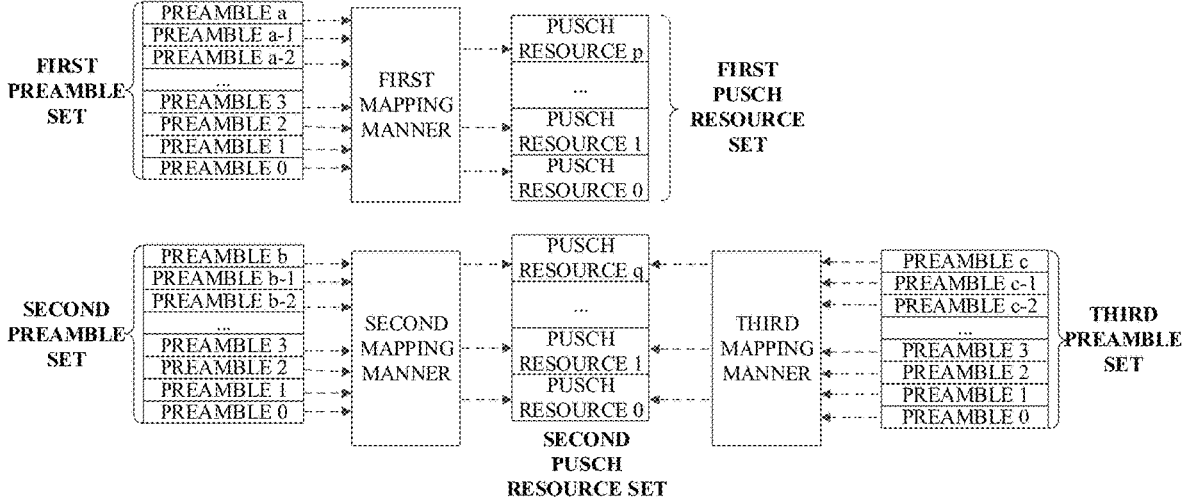
FIG. 14 is a schematic diagram illustrating a mapping between a preamble set and a PUSCH resource set provided in an exemplary implementation of the disclosure.

Exemplarily, referring to FIG. 14, the first-type terminal corresponds to a first preamble set, where the first preamble set includes a+1 preambles. The RedCap terminal of a first sub-type corresponds to a second preamble set, and the RedCap terminal of a second sub-type corresponds to a third preamble set, where the second preamble set includes b+1 preambles, the third preamble set includes c+1 preambles, and a, b, and c are natural numbers. The first preamble set is mapped to a first PUSCH resource set in a first mapping manner. The second preamble set and the third preamble set are mapped to the same second PUSCH resource set in a second mapping manner and a third mapping manner respectively. The first PUSCH resource set and the second PUSCH resource set are different PUSCH resource sets. The first PUSCH resource set includes p+1 PUSCH resources, the second PUSCH resource set includes q+1 PUSCH resources, and p and q are natural numbers. The first mapping manner, the second mapping manner, and the third mapping manner may be the same, different, or partially the same.

Figure 15:
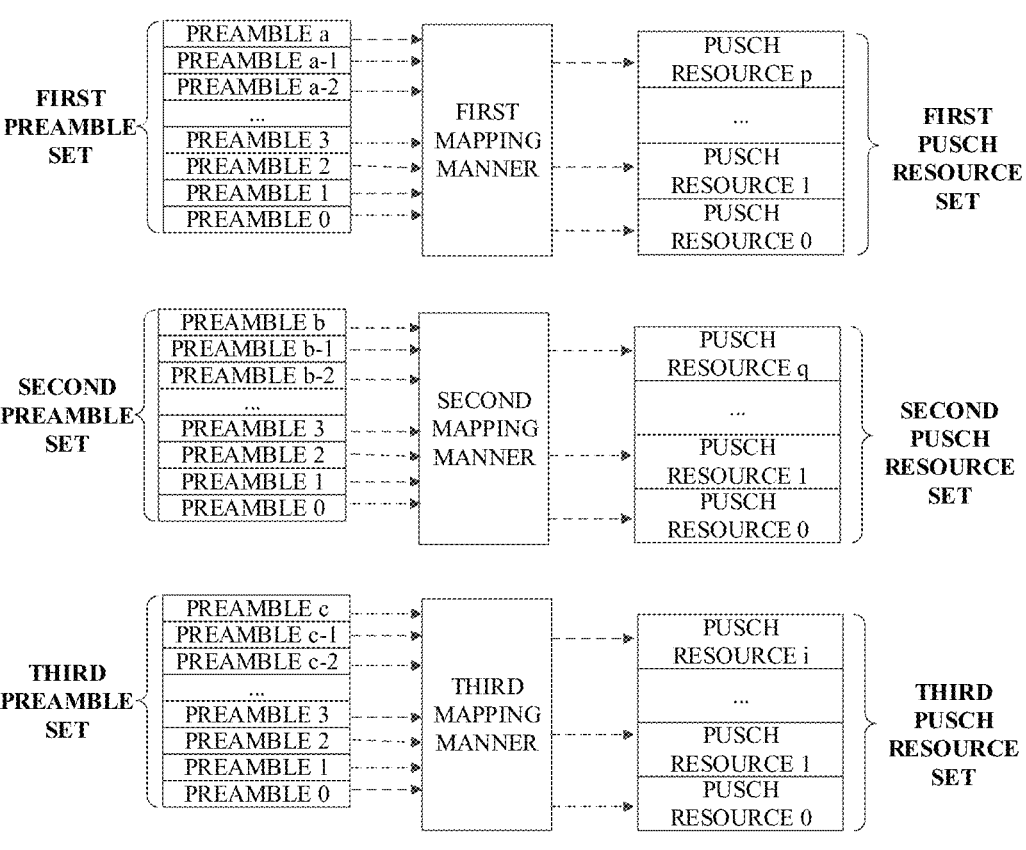
FIG. 15 is a schematic diagram illustrating a mapping between a preamble set and a PUSCH resource set provided in an exemplary implementation of the disclosure.

Exemplarily, referring to FIG. 15, the first-type terminal corresponds to a first preamble set, where the first preamble set includes a+1 preambles. The RedCap terminal of a first sub-type corresponds to a second preamble set, and the RedCap terminal of the second sub-type corresponds to a third preamble set, where the second preamble set includes b+1 preambles, the third preamble set includes c+1 preambles, and a, b, and c are natural numbers. The first preamble set, the second preamble set, and the third preamble set are mapped to different PUSCH resource sets in a first mapping manner, a second mapping manner, and a third mapping manner respectively. The first preamble set corresponds to a first PUSCH resource set, where the first PUSCH resource set includes p+1 PUSCH resources. The second preamble set corresponds to a second PUSCH resource set, where the second PUSCH resource set includes q+1 PUSCH resources. The third preamble set corresponds to a third PUSCH resource set, where the third PUSCH resource set includes i+1 PUSCH resources. p, q, and i are natural numbers. The first mapping manner, the second mapping manner, and the third mapping manner may be the same, different, or partially the same.

In conclusion, according to the method provided in implementations, the second preamble set corresponding to the second-type terminal introduced may be mapped to a PUSCH resource set different from the first preamble set corresponding to the first-type terminal, thereby providing sufficient PUSCH resources for the terminal.

According to the method provided in implementations, when there are second-type terminals of multiple sub-types, preamble sets may be configured for the second-type terminals of different sub-types respectively, and then the preamble sets corresponding to the second-type terminals of different sub-types are mapped to the same PUSCH resource set or different PUSCH resource sets, so that the network device can distinguish sub-types of the second-type terminals according to different preambles.

In an optional implementation based on FIG. 10, before performing mapping, the network device needs to determine the number of PUSCH resources in the PUSCH resource set and the number of preambles in the preamble set.

Optionally, a number of PUSCH resources in the first PUSCH resource set is a product of a number of POs valid for the first-type terminal and a number of DMRS resource indexes in each PO in an association period. A number of PUSCH resources in the second PUSCH resource set is a product of a number of POs valid for the second-type terminal and a number of DMRS resource indexes in each PO in the association period.

Optionally, a number of preambles in the first preamble set is a product of a number of ROs valid for the first-type terminal and a number of preambles in each RO in an association period. A number of preambles in the second preamble set is a product of a number of ROs valid for the second-type terminal and a number of preambles in each RO in the association period.

The association period refers to a period required for one mapping from all preambles in the preamble set to the PUSCH resources. Optionally, the association period is an integer multiple of an RO period. Optionally, the association period is an integer multiple of a PO period.

Exemplarily, referring to FIG. 7, in the association period, the number of valid ROs is 1, the number of preambles in the RO is 16, and thus the number of preambles in the preamble set is 1*16=16. In the association period, the number of valid POs is 4, the number of DMRS resource indexes in each PO is 2, and thus the number of PUSCH resources in the PUSCH resource set is 4*2=8.

In conclusion, according to the method provided in implementations of the disclosure, the network device determines the number of PUSCH resources in the PUSCH resource set and the number of preambles in the preamble set according to the rule mentioned above, to ensure that the preamble set is reasonably mapped to the PUSCH resource set.

It should be noted that, the foregoing method implementations may be implemented separately or in combination, which is not limited in the disclosure.

Figure 16:
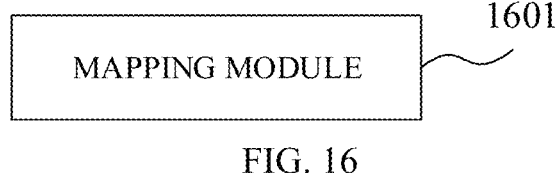
FIG. 16 is a structural block diagram of an apparatus for random access resource determination provided in an exemplary implementation of the disclosure.

FIG. 16 illustrates a structural block diagram of an apparatus for random access resource determination provided in an exemplary implementation of the disclosure. The apparatus may be implemented as a network device or a part of the network device. The apparatus includes a mapping module 1601. The mapping module 1601 is configured to map a first preamble set to a first PUSCH resource set in a first mapping manner, where the first preamble set belongs to a first RO set, and the first preamble set or the first RO set is used for a random access procedure of a first-type terminal. Additionally, the mapping module 1601 is further configured to map a second preamble set to a second PUSCH resource set in a second mapping manner, where the second preamble set belongs to a second RO set, and the second preamble set or the second RO set is used for a random access procedure of a second-type terminal. The random access procedure is a type-2 random access procedure.

In an optional implementation, the second PUSCH resource set is the same as the first PUSCH resource set.

In an optional implementation, the second preamble set or the second RO set is used for the random access procedure of the second-type terminal of a first sub-type. The mapping module 1601 is further configured to map a third preamble set to a third PUSCH resource set in a third mapping manner, where the third preamble set belongs to a third RO set, and the third preamble set or the third RO set is used for the random access procedure of the second-type terminal of a second sub-type. The first PUSCH resource set, the second PUSCH resource set, and the third PUSCH resource set are the same, and the random access procedure is the type-2 random access procedure.

In an optional implementation, the first mapping manner to the third mapping manner are the same, or the first mapping manner to the third mapping manner are different from one another, or at least two of the first mapping manner to the third mapping manner are the same.

In an optional implementation, the second PUSCH resource set is different from the first PUSCH resource set.

In an optional implementation, the second preamble set or the second RO set is used for the random access procedure of the second-type terminal of a first sub-type. The mapping module 1601 is further configured to map a third preamble set to a third PUSCH resource set in a third mapping manner, where the third preamble set belongs to a third RO set, and the third preamble set or the third RO set is used for the random access procedure of the second-type terminal of a second sub-type. The third PUSCH resource set is the same as or different from the second PUSCH resource set, and the random access procedure is the type-2 random access procedure.

In an optional implementation, the first mapping manner to the third mapping manner are the same, or the first mapping manner to the third mapping manner are different from one another, or at least two of the first mapping manner to the third mapping manner are the same.

In an optional implementation, the second mapping manner is the same as or different from the first mapping manner.

In an optional implementation, the second-type terminal includes a RedCap terminal, and the RedCap terminal has a capability lower than the first-type terminal.

In an optional implementation, a number of PUSCH resources in the first PUSCH resource set is a product of a number of POs valid for the first-type terminal and a number of DMRS resource indexes in each PO in an association period. A number of PUSCH resources in the second PUSCH resource set is a product of a number of POs valid for the second-type terminal and a number of DMRS resource indexes in each PO in the association period.

In an optional implementation, a number of preambles in the first preamble set is a product of a number of ROs valid for the first-type terminal and a number of preambles in each RO in an association period. A number of preambles in the second preamble set is a product of a number of ROs valid for the second-type terminal and a number of preambles in each RO in the association period.

Figure 17:
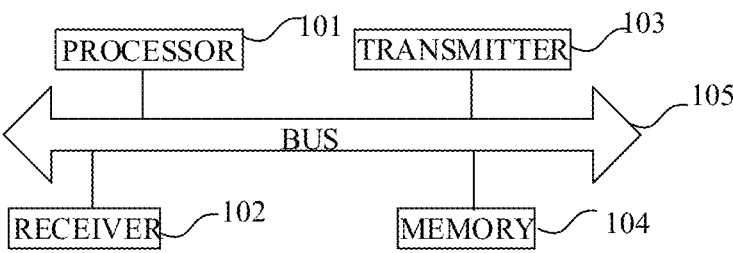
FIG. 17 is a schematic structural diagram of a communication device provided in an exemplary implementation of the disclosure.

FIG. 17 illustrates a schematic structural diagram of a communication device (such as a network device) provided in an exemplary implementation of the disclosure. The communication device includes a processor 101, a receiver 102, a transmitter 103, a memory 104, and a bus 105.

The processor 101 includes one or more processing cores. The processor 101 is configured to perform various functional applications and information processing by running software programs and modules.

The receiver 102 and the transmitter 103 may be implemented as a communication component that may be a communication chip.

The memory 104 is connected with the processor 101 through the bus 105.

The memory 104 can be configured to store at least one instruction, and the processor 101 is configured to execute the at least one instruction to perform operations in the above method implementations.

In addition, the memory 104 can be implemented by any type of volatile or non-volatile storage device or combination thereof. The volatile or non-volatile storage device includes, but is not limited to, a magnetic disk, an optical disk, an electrically-erasable programmable read only memory (EEPROM), an erasable programmable read only memory (EPROM), a static random access memory (SRAM), a read-only memory (ROM), a magnetic memory, a flash memory, and a programmable read-only memory (PROM).

The processor 101 is configured to map a first preamble set to a first PUSCH resource set in a first mapping manner, where the first preamble set belongs to a first RO set, and the first preamble set or the first RO set is used for a random access procedure of a first-type terminal. The processor 101 is further configured to map a second preamble set to a second PUSCH resource set in a second mapping manner, where the second preamble set belongs to a second RO set, and the second preamble set or the second RO set is used for a random access procedure of a second-type terminal. The random access procedure is a type-2 random access procedure.

In an exemplary implementation, the second PUSCH resource set is the same as the first PUSCH resource set.

In a case, the second preamble set or the second RO set is used for the random access procedure of the second-type terminal of a first sub-type. The processor 101 is further configured to map a third preamble set to a third PUSCH resource set in a third mapping manner, where the third preamble set belongs to a third RO set, and the third preamble set or the third RO set is used for the random access procedure of the second-type terminal of a second sub-type. The first PUSCH resource set, the second PUSCH resource set, and the third PUSCH resource set are the same, and the random access procedure is the type-2 random access procedure.

In the case, the first mapping manner to the third mapping manner are the same, or the first mapping manner to the third mapping manner are different from one another, or at least two of the first mapping manner to the third mapping manner are the same.

In an exemplary implementation, the second PUSCH resource set is different from the first PUSCH resource set.

In a case, the second preamble set or the second RO set is used for the random access procedure of the second-type terminal of a first sub-type. The processor 101 is further configured to map a third preamble set to a third PUSCH resource set in a third mapping manner, where the third preamble set belongs to a third RO set, and the third preamble set or the third RO set is used for the random access procedure of the second-type terminal of a second sub-type. The third PUSCH resource set is the same as or different from the second PUSCH resource set, and the random access procedure is the type-2 random access procedure.

In the case, the first mapping manner to the third mapping manner are the same, or the first mapping manner to the third mapping manner are different from one another, or at least two of the first mapping manner to the third mapping manner are the same.

Optionally, the second mapping manner is the same as or different from the first mapping manner.

Optionally, the second-type terminal includes a RedCap terminal, and the RedCap terminal has a capability lower than the first-type terminal.

Optionally, a number of PUSCH resources in the first PUSCH resource set is a product of a number of POs valid for the first-type terminal and a number of DMRS resource indexes in each PO in an association period. A number of PUSCH resources in the second PUSCH resource set is a product of a number of POs valid for the second-type terminal and a number of DMRS resource indexes in each PO in the association period.

Optionally, a number of preambles in the first preamble set is a product of a number of ROs valid for the first-type terminal and a number of preambles in each RO in an association period. A number of preambles in the second preamble set is a product of a number of ROs valid for the second-type terminal and a number of preambles in each RO in the association period.

In an exemplary implementation, a computer-readable storage medium is further provided. The computer-readable storage medium stores computer programs, and the computer programs are loaded and executed by a processor to perform the method for random access resource determination performed by a network device provided in the foregoing method implementations.

In an exemplary implementation, a computer program product is further provided. When running on a processor of a network device, the computer program product causes the network device to perform the method for random access resource determination described in the above aspects.

In an exemplary implementation, a chip is further provided. The chip includes a programmable logic circuit and/or program instructions. When running on a network device, the chip is configured to perform the method for random access resource determination described in the above aspects.

The above are only optional implementations of the disclosure and are not intended to limit the disclosure. Any modification, equivalent replacement, improvement, etc., made within the spirit and principles of the disclosure shall fall within the protection scope of the disclosure.

What is claimed is:

1. A method for random access resource determination, comprising:

mapping a first preamble set to a first physical uplink shared channel (PUSCH) resource set in a first mapping manner, the first preamble set belonging to a first random access channel occasion (RO) set, and the first preamble set or the first RO set being used for a random access procedure of a first-type terminal, wherein the first-type terminal is a terminal other than a reduced-capability (RedCap) terminal; and mapping a second preamble set to a second PUSCH resource set in a second mapping manner, the second preamble set belonging to a second RO set, and the second preamble set or the second RO set being used for a random access procedure of a second-type terminal, wherein the second-type terminal is a RedCap terminal, and the RedCap terminal has a capability lower than the first-type terminal;

wherein the random access procedure is a type-2 random access procedure, a number of preambles in the first preamble set is a product of a number of ROs valid for the first-type terminal and a number of preambles in each RO in an association period; and a number of preambles in the second preamble set is a product of a number of ROs valid for the second-type terminal and a number of preambles in each RO in the association period, wherein the first mapping manner differs from the second mapping manner.

2. The method of claim 1, wherein the second PUSCH resource set is the same as the first PUSCH resource set.

3. The method of claim 2, wherein the second preamble set or the second RO set is used for the random access procedure of the second-type terminal of a first sub-type, and the method further comprises:

mapping a third preamble set to a third PUSCH resource set in a third mapping manner, wherein the third preamble set belongs to a third RO set, and the third preamble set or the third RO set is used for the random access procedure of the second-type terminal of a second sub-type;

wherein the first PUSCH resource set, the second PUSCH resource set, and the third PUSCH resource set are the same, and the random access procedure is the type-2 random access procedure.

4. The method of claim 3, wherein:

the first mapping manner to the third mapping manner are the same; or the first mapping manner to the third mapping manner are different from one another; or at least two of the first mapping manner to the third mapping manner are the same.

5. The method of claim 1, wherein the second PUSCH resource set is different from the first PUSCH resource set.

6. The method of claim 5, wherein the second preamble set or the second RO set is used for the random access procedure of the second-type terminal of a first sub-type, and the method further comprises:

mapping a third preamble set to a third PUSCH resource set in a third mapping manner, wherein the third preamble set belongs to a third RO set, and the third preamble set or the third RO set is used for the random access procedure of the second-type terminal of a second sub-type;

wherein the third PUSCH resource set is the same as or different from the second PUSCH resource set, and the random access procedure is the type-2 random access procedure.

7. The method of claim 6, wherein:

the first mapping manner to the third mapping manner are the same; or the first mapping manner to the third mapping manner are different from one another; or at least two of the first mapping manner to the third mapping manner are the same.

8. The method of claim 1, wherein the second mapping manner is the same as or different from the first mapping manner.

9. The method of claim 1, wherein:

a number of PUSCH resources in the first PUSCH resource set is a product of a number of PUSCH occasions (PO) valid for the first-type terminal and a number of demodulation reference signal (DMRS) resource indexes in each PO in an association period; and a number of PUSCH resources in the second PUSCH resource set is a product of a number of POs valid for the second-type terminal and a number of DMRS resource indexes in each PO in the association period.

10. A network device, comprising:

a processor;

a memory configured to store computer programs; and a transceiver coupled with the processor, wherein the processor is configured to invoke and execute the computer programs stored in the memory to:

map a first preamble set to a first physical uplink shared channel (PUSCH) resource set in a first mapping manner, the first preamble set belonging to a first random access channel occasion (RO) set, and the first preamble set or the first RO set being used for a random access procedure of a first-type terminal, wherein the first-type terminal is a terminal other than a reduced-capability (RedCap) terminal; and map a second preamble set to a second PUSCH resource set in a second mapping manner, the second preamble set belonging to a second RO set, and the second preamble set or the second RO set being used for a random access procedure of a second-type terminal, wherein the second-type terminal is a RedCap terminal, and the RedCap terminal has a capability lower than the first-type terminal;

wherein the random access procedure is a type-2 random access procedure, a number of preambles in the first preamble set is a product of a number of ROs valid for the first-type terminal and a number of preambles in each RO in an association period; and a number of preambles in the second preamble set is a product of a number of ROs valid for the second-type terminal and a number of preambles in each RO in the association period, wherein the first mapping manner differs from the second mapping manner.

11. A non-transitory computer-readable storage medium storing computer programs, the computer programs being loaded and executed by a processor to:

map a first preamble set to a first physical uplink shared channel (PUSCH) resource set in a first mapping manner, the first preamble set belonging to a first random access channel occasion (RO) set, and the first preamble set or the first RO set being used for a random access procedure of a first-type terminal, wherein the first-type terminal is a terminal other than a reduced-capability (RedCap) terminal; and map a second preamble set to a second PUSCH resource set in a second mapping manner, the second preamble set belonging to a second RO set, and the second preamble set or the second RO set being used for a random access procedure of a second-type terminal, wherein the second-type terminal is a RedCap terminal, and the RedCap terminal has a capability lower than the first-type terminal;

wherein the random access procedure is a type-2 random access procedure, a number of preambles in the first preamble set is a product of a number of ROs valid for the first-type terminal and a number of preambles in each RO in an association period; and a number of preambles in the second preamble set is a product of a number of ROs valid for the second-type terminal and a number of preambles in each RO in the association period, wherein the first mapping manner differs from the second mapping manner.

12. The network device of claim 10, wherein the second PUSCH resource set is the same as the first PUSCH resource set.

13. The network device of claim 12, wherein the second preamble set or the second RO set is used for the random access procedure of the second-type terminal of a first sub-type, and the processor is further configured to:

map a third preamble set to a third PUSCH resource set in a third mapping manner, wherein the third preamble set belongs to a third RO set, and the third preamble set or the third RO set is used for the random access procedure of the second-type terminal of a second sub-type;

wherein the first PUSCH resource set, the second PUSCH resource set, and the third PUSCH resource set are the same, and the random access procedure is the type-2 random access procedure.

14. The network device of claim 13, wherein:

the first mapping manner to the third mapping manner are the same; or the first mapping manner to the third mapping manner are different from one another; or at least two of the first mapping manner to the third mapping manner are the same.

15. The network device of claim 10, wherein the second mapping manner is the same as or different from the first mapping manner.

16. The network device of claim 10, wherein:

a number of PUSCH resources in the first PUSCH resource set is a product of a number of PUSCH occasions (PO) valid for the first-type terminal and a number of demodulation reference signal (DMRS) resource indexes in each PO in an association period; and a number of PUSCH resources in the second PUSCH resource set is a product of a number of POs valid for the second-type terminal and a number of DMRS resource indexes in each PO in the association period.

* * * * *